United States Patent [19]

Schoenpflug

[11] Patent Number: 4,935,044
[45] Date of Patent: Jun. 19, 1990

[54] PURIFICATION OF CRUDE ARGON
[75] Inventor: Eugen Schoenpflug, Penzberg, Fed. Rep. of Germany
[73] Assignee: Linde Aktiengesellschaft, Wiesbaden, Fed. Rep. of Germany
[21] Appl. No.: 316,706
[22] Filed: Feb. 28, 1989
[30] Foreign Application Priority Data
  Mar. 1, 1988 [DE] Fed. Rep. of Germany ....... 3806523
[51] Int. Cl.$^5$ ................................................. F25J 3/04
[52] U.S. Cl. ............................................ 62/22; 55/66
[58] Field of Search ............................... 62/22; 55/66
[56] References Cited
U.S. PATENT DOCUMENTS 2,874,030  2/1959  Dennis ..................................... 62/22
2,909,410 10/1959  Fedorko ................................... 62/22
3,173,778  3/1965  Gaumer, Jr. ............................. 62/22
3,181,306  5/1965  Geist et al. ............................. 62/22

FOREIGN PATENT DOCUMENTS
3428968 2/1986 Fed. Rep. of Germany .

Primary Examiner—Ronald C. Capossela
Attorney, Agent, or Firm—Millen, White & Zelano

[57] ABSTRACT

For the purification of crude argon, which accumulates partly in liquid form and partly in gaseous form in the head of a crude argon column, most of the crude argon is removed in liquid form (4) and its pressure is increased by use of the hydrostatic potential. Then, the crude argon accumulated in liquid form is evaporated (6), freed of oxygen (9, 10) and fed to a rectification (13). Crude argon accumulated in gaseous form (5) is also reprocessed by being compressed and fed to the evaporated crude argon. The compression is preferably conducted in conjunction with the compression of excess hydrogen recycle gas.

16 Claims, 1 Drawing Sheet

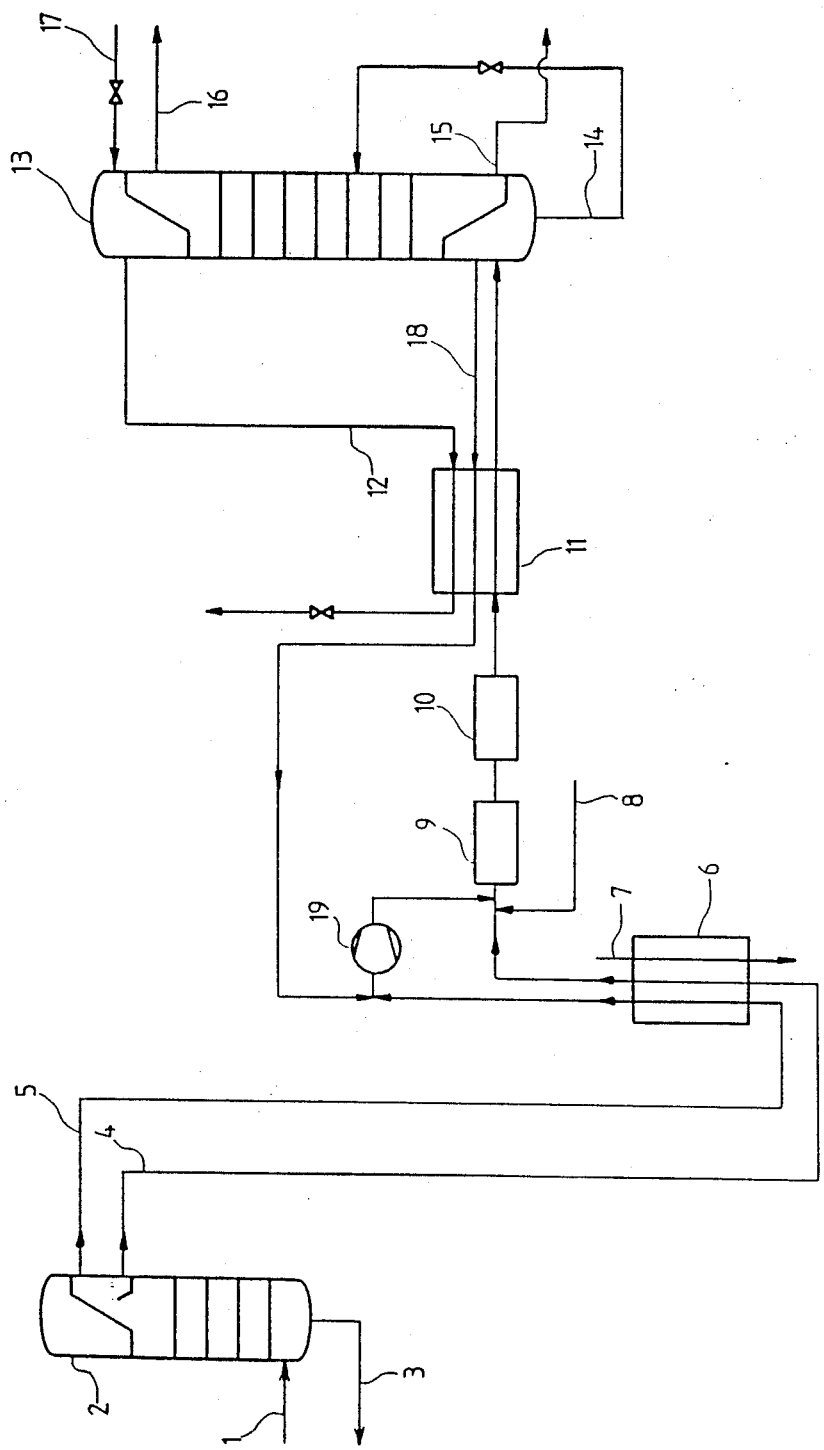

PURIFICATION OF CRUDE ARGON

BACKGROUND OF THE INVENTION

This invention relates to a process for purification of crude argon.

By "crude argon" is meant a mixture, which contains about 90 to 99% by volume of argon and small amounts of oxygen and nitrogen. Such a mixture accumulates at the head of a crude argon column, which is connected to a unit for the low-temperature separation of air. To recover pure argon (about 99.999%) from crude argon, the crude argon must be purified, for example, by rectification in a pure argon column.

In a process of this type, which is known from DE-OS 34 28 968 (FIG. 2), the crude argon is removed in liquid form from the head of the crude argon column. To prevent operating troubles in the crude argon column, a part of the crude argon in the head of the column is removed in gaseous form and recycled to the air separation unit. The crude argon removed in liquid form undergoes an increase in pressure by virtue of its hydrostatic head and is then evaporated. After the addition of hydrogen, the oxygen contained in the crude argon is reacted therewith, and the resulting $H_2O$ is removed in a drier. The remaining gas mixture is cooled and finally is passed into the pure argon column.

Such a process, on the one hand, is advantageous since the pressure increase of the crude argon requires no additional machinery, but on the other hand, it is economically unsatisfactory because a part of the recovered crude argon is recycled to the air separation unit, whereby separation work already performed is lost in the process.

SUMMARY OF THE INVENTION

An object of a main aspect of this invention is to provide an economically more favorable process, especially by increasing the argon yield.

Upon further study of the specification and appended claims, further objects and advantages of this invention will become apparent to those skilled in the art.

To achieve the object of the main aspect of this invention, in accordance with one embodiment of the invention, the crude argon accumulated in gaseous form in the head of the crude argon column is recombined downstream with the crude argon accumulated in liquid form after evaporation of the latter. In this way, the crude argon accumulated in the gaseous form is not recycled, but instead contributes to an overall very high argon yield. The advantage of the machineless type of pressure increase of the crude argon removed in liquid form can also be maintained. In this connection, it is to be considered that in the usual crude argon recovery, a part of the crude argon must always be removed in gaseous form so that the head condenser of the crude argon column will not be blocked by uncondensable gases.

According to an advantageous embodiment of the invention, after the water is separated from the gas, a hydrogen-containing gas is diverted from the remaining gas mixture and recycled to the crude argon accumulated in gaseous form before reaction with oxygen. In this way, the crude argon accumulated in gaseous form can be compressed together with the recycled hydrogen-containing gas which must be compressed in any case. Thus, the high argon yield can be achieved with a very small outlay of equipment.

In another variant of the process according to the invention, the crude argon accumulated in gaseous form is condensed and fed to the crude argon accumulated in liquid form before the pressure increase. Also, in this way, the crude argon accumulated in gaseous form can be compressed without an additional compressing device. The condensing necessary for this purpose can be performed at a favorable cost in indirect heat exchange with product or intermediate product streams of the unit, for example vaporizing liquid nitrogen from the air separation.

BRIEF DESCRIPTION OF THE DRAWINGS

A preferred comprehensive embodiment of the invention is diagrammatically represented in the FIGURE.

DETAILED DESCRIPTION OF THE DRAWING

A crude argon column 2 is connected, by a feed pipe 1 and a removal pipe 3, to an air separation unit (not shown). Crude argon column 2 is operated under a pressure of 1.1 to 3 bars, usually about 1.2 bars. Crude argon is recovered as overhead product with a temperature of 88 to 100 K, preferably 89 K. Crude argon consists essentially of 90 to 99%, preferably about 95% of argon, and, moreover, contains oxygen and nitrogen.

Most (80 to 97%, preferably 90 to 95%) of the crude argon is removed in liquid state by a liquid pipe 4. The height of liquid pipe 4 is so great that the pressure of the liquid crude argon is increased to 3 to 5, preferably 4 bars. Then, the liquid crude argon is evaporated in heat exchanger 6 countercurrently to a warming gas (for example, air or nitrogen).

Hydrogen, with which the oxygen contained in the crude argon is reduced to water in a reactor 9, is added by pipe 8. Then, a drier 10 follows, in which the water formed in the reaction is separated. The remaining gas mixture contains essentially argon, nitrogen and hydrogen, the latter being generally added in excess before reactor 9 to ensure a complete as possible removal of the oxygen. The gas mixture is cooled in heat exchanger 11 countercurrently to the nitrogen in pipe 12 and fed as heating fluid to the bottom of a pure argon column 13, where the main part (e.g. more than 99%) of the gases originally withdrawn from the crude argon column 2 via lines 4 respectively 5 is condensed.

The liquid portion of the resultant mixture is transported via pipe 14, expanded, and fed into pure argon column 13 where it is subjected to rectification under a pressure of 1.2 to 2 bars, preferably 1.5 bars. The head of the pure argon column 13 in this case is cooled by liquid nitrogen (pipe 17). Liquid pure argon 15 and residual gas 16 are removed as product fractions.

The gaseous portion of the mixture used for bottom heating, which contains the excess hydrogen, is removed from the bottom by pipe 18, warmed in heat exchanger 11, compressed in compressor 19 to about 3 to 5 bar, preferably 4 bar, and added to the crude argon before reactor 9.

To prevent blocking of the head condenser of crude argon column 2, a small part of the crude argon (3 to 20%, preferably 5 to 10%) is removed in the gaseous state by pipe 5. This crude argon removed in gaseous form is warmed up in heat exchanger 6 and according to the invention is compressed (19) and fed to the crude argon removed in liquid form, which was evaporated in heat exchanger 6.

According to a further feature of the invention, the recycled hydrogen-containing gas and the crude argon removed in gaseous form are compressed together in compressor 19.

The entire texts of all applications, patents and publications, if any, cited above and of corresponding application(s) are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for purifying crude argon accumulating in the head of a crude argon column partly in liquid form and partly in gaseous form, comprising:
   evaporating, under increased pressure, crude argon accumulated in liquid form;
   compressing crude argon, accumulated in gaseous form, and combining it with said crude argon accumulated in liquid form after evaporation of the latter;
   reacting oxygen contained in the crude argon with hydrogen to form water;
   separating the formed water from the gas mixture;
   cooling the remaining gas mixture; and
   separating the cooled gas mixture into a liquid pure argon fraction and a residual gas fraction by rectification.

2. A process according to claim 1, wherein, after separation of the water, a hydrogen-containing gas is separated from the remaining gas mixture and is recycled to said crude argon before reaction with hydrogen and wherein said crude argon accumulated in gaseous form is compressed together with the hydrogen-containing gas.

3. A process according to claim 2, wherein said crude argon accumulated in gaseous form ad said hydrogen-containing gas are compressed together to a pressure of about 3-5 bar.

4. A process according to claim 1, wherein said crude argon accumulated in liquid form and said crude argon accumulated in gaseous form are obtained from a crude argon column of an air separation unit.

5. A process according to claim 1, wherein said crude argon column is operated under a pressure of 1.1-3 bars.

6. A process according to claim 5, wherein prior to evaporation, the pressure of said crude argon accumulated in liquid form removed from said crude argon column is increased to 3-5 bars by hydrostatic pressure.

7. A process according to claim 1, wherein said crude argon accumulated in gaseous form and said crude argon accumulated in liquid form are recovered as overhead product from said crude argon column at a temperature of 88-100 K.

8. A process according to claim 1, wherein said crude argon is 90-99% argon.

9. A process according to claim 1, wherein 80-97% of the crude argon removed from said crude argon column is removed in the liquid state.

10. A process according to claim 1, wherein 3-20% of the crude argon removed from said crude argon column is removed in the gaseous state.

11. A process according to claim 1, wherein formed water is separated from the gaseous mixture in a dryer and the remaining gas mixture discharged from the dryer consists essentially of argon, nitrogen, and hydrogen.

12. A process according to claim 1, wherein after cooling said remaining gas mixture, the cooled gas mixture is employed to heat the bottom of an argon purification column before being delivered to said argon purification column for said rectification.

13. A process according to claim 12, wherein rectification is performed in said argon purification column at a pressure of 1.2-2 bars.

14. A process according to claim 1, wherein after separation of the water, a hydrogen-containing gas is separated from the remaining gas mixture, compressed to about 3-5 bar, and recycled to the crude argon before reaction with hydrogen.

15. A process for purifying crude argon accumulating in the head of a crude argon column partly in liquid form and partly in gaseous form, comprising:
   evaporating, under increased pressure, crude argon accumulated in liquid form;
   condensing crude argon, accumulated in gaseous form and combining it with said crude argon accumulated in liquid form before increasing of the pressure;
   reacting oxygen contained in the crude argon with hydrogen to form water;
   separating the formed water from the gas mixture;
   cooling the remaining gas mixture; and
   separating the gas mixture into a liquid pure argon fraction and a residual gas fraction by rectification.

16. A process according to claim 15, wherein said crude argon accumulated in gaseous form is condensed by heat exchange with liquid nitrogen from an air separation unit.

* * * * *